United States Patent [19]

MaCleod

[11] Patent Number: 4,488,076

[45] Date of Patent: Dec. 11, 1984

[54] TACHOMETER ASSEMBLY FOR MAGNETIC MOTORS

[75] Inventor: Donald J. MaCleod, Aptos, Calif.

[73] Assignee: Applied Motion Products, Inc., Scotts Valley, Calif.

[21] Appl. No.: 429,076

[22] Filed: Sep. 30, 1982

[51] Int. Cl.³ .............................................. H02K 21/12
[52] U.S. Cl. .................. 310/171; 310/67 R; 310/154; 310/268
[58] Field of Search .......... 310/46, 154, 156, 180–184, 310/198–208, 171, 268, 165, 67, 68, 266, 112, 113, 160; 314/208, 174; 361/236, 239, 240

[56] References Cited

U.S. PATENT DOCUMENTS

| | | | |
|---|---|---|---|
| 4,009,406 | 2/1977 | Inariba | 310/164 |
| 4,260,920 | 4/1981 | Nakamura et al. | 310/156 |
| 4,311,933 | 1/1982 | Riggs et al. | 310/156 |
| 4,359,657 | 11/1982 | Matsumoto et al. | 310/156 |

Primary Examiner—R. Skudy
Assistant Examiner—D. L. Rebsch
Attorney, Agent, or Firm—Michael J. Hughes

[57] ABSTRACT

A tachometer assembly is provided for use with electrical rotary magnetic motors. The assembly includes a conventional brushless DC motor (12) having a radially polarized main field ring magnet (24) forming the rotor (16) about a stator (18). The tachometer portion includes a commutator ring magnet (26) formed on one edge of the main field magnet (24) and an axially displaced circuit board (14) including one or more unbranched conducting traces (40). The commutator ring (26) includes a plurality of alternately axially polarized segments (27) which induce sinusoidal signals in the conductive traces (40) as the rotor (16) is rotated with respect to the circuit board (14). The tachometer assembly is utilized to generate rotational velocity and analog positional data for manipulation and control of the motor (12). The primary uses are in servo control mechanisms in the data processing and computer peripheral industries.

15 Claims, 5 Drawing Figures

TACHOMETER ASSEMBLY FOR MAGNETIC MOTORS

TECHNICAL FIELD

The present invention relates generally to velocity sensing devices and more particularly to magnetic rotational velocity sensors for use with electrical motors. The predominant current usage of the improved magnetic motor tachometer assembly of the present invention is in connection with brushless electrical motors such as those used within the data processing industry.

BACKGROUND ART

High technology industries have developed numerous uses for precisely controlled electrical motors. One of the most popular types of these motors is the brushless magnetic motor which is frequently used in computer systems and peripherals. Due to the high precision required in these applications, it is desirable to obtain extremely accurate measurements as to the rotational velocity of the motor at all times. The velocity measurement provides an analog for position sensing and thus permits servo control of the mechanism to which the motor is attached.

Various devices have been utilized in the prior art to sense the velocity of rotating motors. Optical methods of scanning a rotating portion of the motor, and thereby sensing velocity, have been disclosed in U.S. Pat. No. 4,228,387, issued to W. S. Brown and also in U.S. Pat. No. 4,258,622, issued to S. Estrabaud, et al. Optical methods such as these require exterior sensing devices and relatively complex decoding components. This type of device often significantly adds to the cost and complexity of the motor assembly.

Another common velocity sensor method utilizes the Hall effect to provide analog velocity measurements. The Hall effect devices incorporate the response of certain semiconductor materials to magnetic field variances. The prior art Hall effect devices have limited frequency response and are expensive and difficult to manufacture for high accuracy applications. Hall effect sensors are also single point sensing devices which do not cancel out minor concentricity errors in the magnet.

Magnetic tachometer devices have also been frequently used in the prior art for sensing rotational velocity. One example of a prior art magnetic tachometric device is disclosed in U.S. Pat. No. 3,504,208, issued to J. D. Rivers. Prior art magnetic tachometer devices such as those disclosed by Rivers require complex assembly, and require commutating brushes which tend to increase system friction and require periodic replacement. In this manner, the prior art magnetic tachometric devices have limited usable lifetimes. Furthermore, they are not desirable in high velocity constant use applications, such as data processing applications of high speed electrical motors.

One further method of magnetically sensing the rotational velocity of a motor utilizes a plurality of magnetic poles rotating with the meter in relation to a series of induction coils or traces. The rotation of the poles with relation to the conducting elements induces a current within the conducting elements which may be measured as an analog for the velocity of the motor. One application of this type of rotational velocity sensor is disclosed in the co-pending and co-assigned applicatioin of Kenneth Kordik for an "Improved Magnetic Rotational Velocity Sensor." Such a sensor is particularly for use with a stepper motor and not with continuous velocity rotational motors.

Applicant is further aware of the use of a separate ring magnetically polarized to include a plurality of alternating magnetic poles, which is attached to the motor in such a manner that it rotates past a circuit board including a number of conducting traces in which the current is induced. Such applications have been utilized in those electrical motors wherein the main motor magnet utilizes an axial field. In this manner, the tachometric alternately polarized ring also has an axial field. In these applications the main motor magnet and the alternately polarized tachometric ring are separately manufactured items.

The prior art rotational velocity sensors commonly share the disadvantages of complexity and difficulty of manufacture. Those devices which are simple and easily manufactured do not have sufficient resolution to accurately measure the rotational velocity of high speed electrical motors. Attempts to increase the number of motor magent poles to achieve higher frequency measurement leads to significant increases in cost. None of the prior art methods solve all the problems relating to extreme accuracy, low cost and ease of manufacture.

DISCLOSURE OF INVENTION

Accordingly, it is an object of the present invention to provide an improved magnetic motor tachometer assembly adaptable for use in motors utilizing a radial magnetic field main motor magnet.

It is another object of the present invention to provide an extremely high accuracy analog velocity sensor which is economical and easy to manufacture.

It is a further object of the present invention to provide a method of increasing the frequency range of accurate measurement without requiring an increase in the number of magnetic poles on the commutator magnet.

This invention relates to methods of sensing the rotational velocity, and therefore, by analog logic, the position of the rotational shaft of a constantly rotating electrical motor. The present invention is particularly adapted for use with high speed brushless electrical direct current motors such as those used in computer peripheral systems.

Briefly, a preferred embodiment of the present invention is an improved magnetic motor tachometer assembly for use with rapidly rotating electrical motors. The motor includes a rotor portion which rotates with respect to a stator portion. The tachometer assembly includes a commutator magnet portion integrally formed with the radially polarized main field magnet which is attached to the rotor portion. The commutator magnet portion includes a plurality of spatially equivalent alternately polarized sectors, each sector being polarized axially to the rotation of the rotor. The stator portion includes a circuit board separated by an axial air gap from the commutator magnet portion and including an array of conducting traces arrayed opposite the commutator magnet. The conducting traces are situated such that the rotation of the commutating magnet past the traces on the circuit board induces a current in the traces. The resulting current is a waveform signal in the form of a sine wave. The sine wave may be analyzed by any of several well known analog methods to determine the velocity of rotation of the rotor. The preferred embodiment of the commutating magnet includes a sixty-four alternately polarized sectors, with thirty-two polarized axially North and thirty-two polarized axially South. The stator circuit board includes a first conductive trace arrayed in an open ring fashion opposite the commutating magnet ring and including sixty-four radially arrayed segments. The stator circuit board may further include an equivalent second conducting trace separated by a layer of insulating material from the first conducting trace and radially offset from the first conducting trace such that the sixty-four radial segments of the second conductive trace are arrayed axially between the radial segments of the first conductive trace in relation to the commutator magnet.

An advantage of the present invention is that it provides a simple and economically manufactured magnetic velocity sensor for use with conventional brushless direct current motors.

Another advantage of the present invention is that the multiple sets of traces on the stator circuit board provide for improved frequency range of measurement without increasing the number of poles on the commutator magnet.

A further advantage of the present invention is that the rotational velocity of the system rotor may be measured without introducing additional friction into the assebmly.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTIONS

Figure 1:
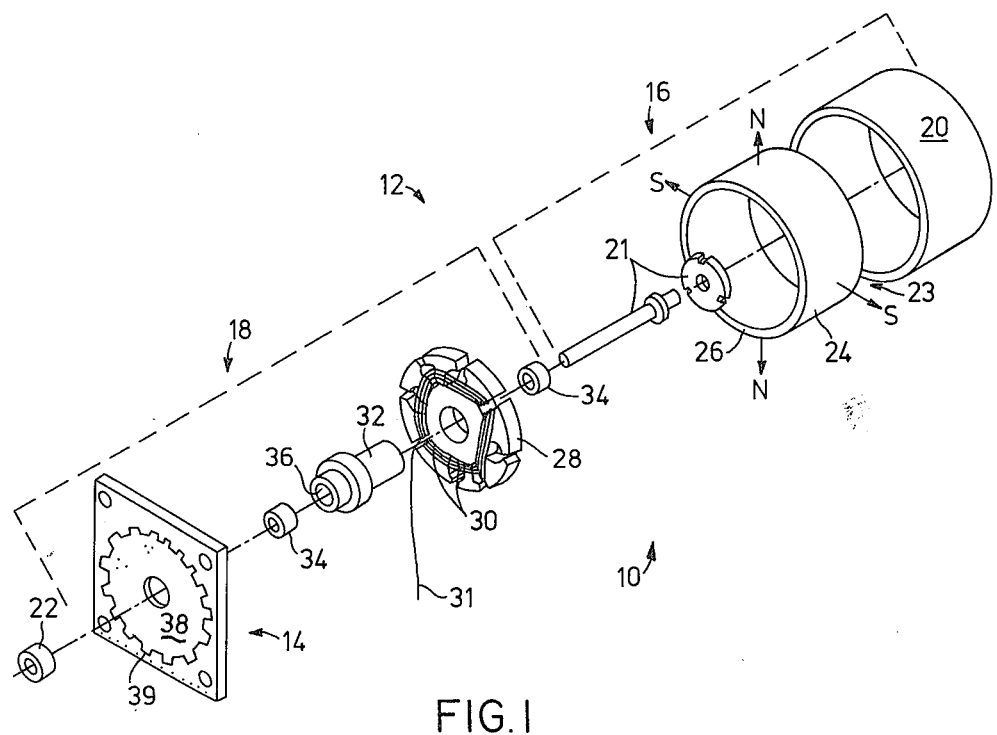
FIG. 1 is an exploded perspective view of a brushless direct current electrical motor including the improved magnetic motor tachometer assembly of the present invention.

The best presently known mode of practicing the present invention is an improved magnetic motor tachometer assembly adapted for use with a brushless direct current (DC) electrical motor, as illustrated in the drawing. The improved magnetic tachometer assembly is utilized in conjunction with well known analog means for decoding the electrical signal generated by the sensor assembly and providing rotational velocity information regarding the motor.

The presently preferred improved magnetic motor tachometer assembly, shown as installed upon a conventional brushless DC motor utilizing a radially polarized motor field magnet, is illustrated in an exploded perspective view FIG. 1. The entire assembly is designated by the general reference character 10. The assembly 10 includes a brushless DC motor 12 and a circuit board portion 14.

The brushless DC motor 12 includes a rotor portion 16 and a stator portion 18. When the motor 12 is mounted the rotor portion 16 rotates with respect to the stationary stator portion 18. The rotor portion 16 includes various rigidly attached components which rotate together. The stator portion 18 includes various rigidly connected elements which maintain the same spatial position.

The rotor portion 16 includes a rotor case 20. The rotor case 20 is in the shape of a squat cylinder with one end of the cylinder closed and the other open. The cylinder encloses the other elements of the rotor portion 16. Attached to the rotor case 20, at the center of the end of the cylinder, and providing the rotational axis for the rotor 16, is a rotor shaft 21. Shaft 21 includes a plate by which it is attached to the case 20 and extends through the stator 18. At the end of shaft 21 opposite the rotor case 20 is a pulley 22. The pulley 22 provides the means by which the motor 12 is connected to whatever apparatus is being driven thereby. A cylindrical permanent magnet 23 is attached to the interior of the rotor case 20 along the cylinder wall. The permanent magnet 23 is shown independently in a perspective view in FIG. 2. As illustrated in more detail in FIG. 2, the permanent magnet 23 includes two distinct portions, a main field magnet portion 24 situated to the interior of the cylindrical case 20 and a commutator magnet portion 26 situated at the opening of the cylinder. The main field magnet 24 provides the magnetic flux which interacts with the stator portion 18 of the motor 12 and provides the motive reaction.

Figure 3:
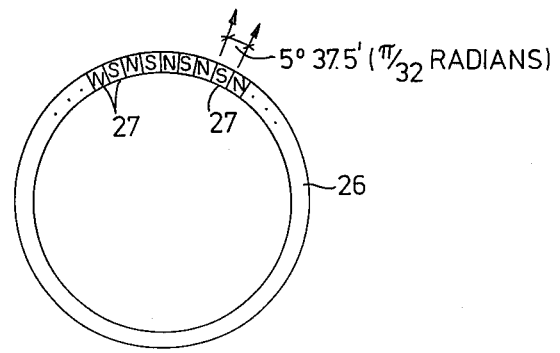
FIG. 3 is a front elevational view of the commutating ring portion of the motor magnet, schematically illustrating the polarization thereof.

The commutator magnet portion 26, also known as the tachometer magnet, is polarized axially. The commutator magnet 26, viewed end on, is visualized as a ring of alternately polarized sectors 27 (see FIG. 3). As shown in FIG. 3, the alternately polarized sectors 27 are equivalent in size and shape and are axially polarized such that the polarity of one is with the magnetic flux extending out of the surface of the magnet while the next sector 27 has the magnetic flux going into the surface of the magnet. These are referred to, by convention, as alternating North and South polarized sectors. The commutator magnet 26 interacts with the circuit board portion 14 to provide the tachometric rotational velocity measurement for the motor 12.

The stator portion 18 of the motor 12 includes a lamination stack 28 upon which are mounted a plurality of stator windings 30. The stator windings 30 are constructed of numerous windings of conductive wire arranged about the insulating lamination stack 28. The preferred embodiment 10 incorporates eight winding coils 30 equally radially spaced on the lamination stack 28. The windings 30 are connected to DC conductive wires 31 which extend to conventional power control circuitry. Manipulation of the current passing through the discrete windings 30 causes varying electromagnetic fields to form around the stator windings 30. The interaction of the main field magnet portion 24 with the electromagnetic fields created about the windings 30 causes the rotation of the rotor portion 16.

The lamination stack 28 and the stator windings 30 mounted thereon, are supported on a post-like stator core 32. The stator core 32 is cylindrical and hollow such that the rotor shaft 21 passes through the center thereof. In the interior of the stator core 32 are situated a plurality of bearings 34. The bearings 34 maintain the rotor shaft 21 in position and minimize the friction involved in rotation thereof. The bearings 34 are also separated by a spacer 36 contained in the interior of the stator core 32.

At the bottom end of the post formed by the stator core 32 is mounted a printed circuit mounting plate 38. The printed circuit mounting plate 38 provides the structural member of the circuit board portion 14 of the assembly 10. The circuit board portion 14 includes the mounting plate 38 and a series of conducting traces 39. One preferred arrangement of the conducting traces 39 on the mounting plate 38 is illustrated in FIG. 4.

Figure 2:
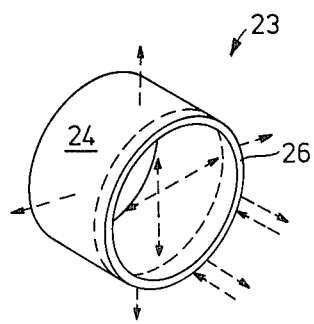
FIG. 2 is a perspective view of the motor magnet illustrating the field magnet portion and the commutating magnet portion with schematic illustration of the magnetic flux.

As illustrated in FIG. 2 the permanent magnet 23 is in the form of a hollow cylinder with the major portion thereof constituting the radially polarized main field magnet portion 24. A planar ring at the outer edge of magnet 23 forms the axially polarized commutator magnet portion 26. The commutator magnet portion 26 is alternately axially polarized to form the alternate sectors 27. The direction of magnetic flux of the portions of the magnet 23 are shown in phantom.

Referring now to FIG. 3, the alternately polarized sectors 27 of the commutator magnet portion 26 are illustrated in schematic fashion. In this figure, the commutator magnet 26 is seen edge on with the magnetic flux lines extending into and out of the paper in a perpendicular fashion. In the preferred embodiment the commutator magnet 26 includes sixty-four spatially equivalent alternately polarized sectors 27 arranged equally about the ring. The spacing of the alternately polarized sectors 27 is such that each sector occupies five degrees and thirty-seven point five minutes (5°37.5′) of arc ($\pi/32$ radians).

Figure 4:
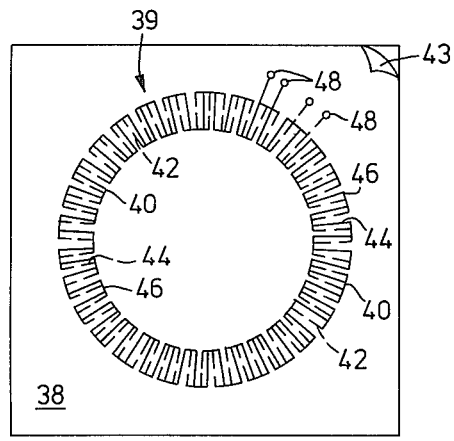
FIG. 4 is a top plan view of the stator circuit board illustrating the first conductive traces and, in phantom, the second conductive trace.

Referring now to FIG. 4, one preferred arrangement of conductive traces 39 on the printed circuit mounting plate 38 is illustrated in a top plan view. In this illustration it may be seen that the conductive traces 39 include a first conductive trace 40 which is arrayed on the surface of the plate 38. An optional second conductive trace 42, illustrated in phantom, is separated from the surface and from the first conductive trace 40 by an insulating layer 43 as shown in a peeled back portion in one corner of mounting plate 38. It is necessary to electrically isolate the second trace 42 from the first trace 40 since the traces are intended to deliver independent signals. The second conductive trace 42 is identical in array to the first conductive trace but it is offset by one-half segment.

The array of the conductive traces 39 is very similar in shape to that of the polarized sectors 27 of the commutator magnet 26. The traces 39 are arrayed in a ring fashion including a plurality of radial segments 44 connected by a plurality of arcical segments 46. Each of the first conducting trace 40 and the second trace 42 includes sixty-four radial segments 44 equally spaced about the ring. The arcical connecting segments 46 connect the radial segments 44 to each other to maintain a constant conducting path.

Each of the first conductive trace 40 and the second conducting trace 42 is a continuous unbranched conductor extending about the ring except at the ends thereof. At each end of each of the circumferential traces 39 is a connecting point 48. The connecting point 48 provides a means by which the electrical signal generated in the traces 39 may be delivered to processing means for analysis (not shown).

Another embodiment of the second conductive trace 42 is envisioned which may be printed on the same surface as the first trace 40. This alternate second trace (not shown) is identical in shape to the first trace 40 but is radially smaller such that the entire alternate trace is arrayed radially within the first trace and slightly offset to avoid a redundant signal. Use of the alternate trace facilitates manufacture by eliminating the need for the insulating layer 43. However, since it is necessary for the radial segments 44 to overlap the polarized sectors 27 the use of the alternate second trace requires a thicker commutator ring portion 26 or else shorter radial segments 44 which may result in a weaker signal.

The diameter of the ring formed by the conductive traces 40 and 42 is equivalent to the diameter of the commutator magnet ring 26. In this manner, the polarized sectors 27, at rest, may be lined up directly such that the centers of the polarized sectors 27 coincide with the radial segments 44 of either the first or second conductive trace. Because of the manner in which the rotor portion 16 is mounted on the stator portion 18 the polarized sectors 27 are separated from the radial segments 44 by an axial air gap. This air gap is uniform around the entire circumference of the rings.

When the rotor portion 16 of the motor 12 rotates with respect to the stator portion 18, the polarized sectors 27 of the commutator magnet 26 are rotated past the radial segments 44 of the conductive traces 39. The relative motion of the perpendicular magnetic fluxes of the polarized sectors 37 with respect to the radial segments 44 induces an electrical current within the trace 39 at the radial segments 44. Since the polarized sectors 27 are alternately polarized in North and South fashion the resulting current in the traces 39 alternates direction. In this manner, a cyclical (sine wave) output is obtained at the connecting points 48 for each of the traces 40 and 42.

Figure 5:
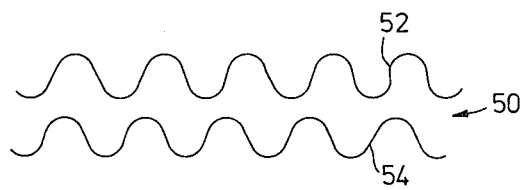
FIG. 5 schematically illustrates a typical analog output of the first conductive trace and the second conductive trace.

The arcical segments 46 alternate from the outside of the ring to the inside of the ring such that a uniform continuous wave is generated by the rotation of the commutator magnet portion 26. When a North polarized sector 27 passes a given radial segment 44 the adjacent radial segments are opposite South polarized sectors. The induced current in the adjacent radial segments is therefore flowing in opposing radial directions. However, due to the alternate placement of the arcical segments 46, the net current flow is in the same direction in the continuous trace array 39. The current flow reverses when the rotor 16 rotates to a position where oppositely polarized sectors 27 pass the same given radial segments 44. This alternating current flow produces the sine wave output. A typical output of traces 40 and 42 is illustrated in schematic fashion in FIG. 5. The total wave form output 50 includes a first trace output 52 and a second trace output 54. The frequency and amplitude of the wave form output 50 is analagous to the rotational velocity of the rotor 16 with respect to the stator 18. Since the second trace 42 is radially offset by one-half sector from the first trace 40 the second trace output 52 is offset ninety degrees from the first trace output 50.

It is not normally feasible to polarize the sectors 27 in a perfect manner. Therefore each sector is most strongly polarized in the center and the magnetic field strength decreases towards the borders. This arrangement results in the broad sine wave curves shown in FIG. 5. If the polarized sectors 27 were perfectly uniform in field strength, the outputs 50 would be square waves.

Analyzing and processing means utilized in conjunction with the tachometer assembly 10 process the wave form output 50 to determine the rotational velocity of the rotor 16. The analyzing and processing means may then apply controlling signals to the stator windings 30 in a manner in which the velocity of the rotor 16 may be modified to the desired level. Analyzing and processing means are well known in the art and are not a part of the present invention.

The presently preferred embodiment of the improved magnetic motor tachometer assembly 10 utilizes an Applied Motion Products, Inc. DC brushless motor.

The rotor case 16 (part no. 450-1020) is constructed of magnetic steel, has an outside diameter of 44.45 mm (1.750 in.), and inside diameter of 41.41 mm (1.73 in.) and a height of 15.24 mm (0.60 in.). The rotor shaft 21 (part no. 400-1124) is steel with a diameter of 3.17 mm (0.125 in.) and a length of approximately 31 mm (1.2 in.). The shaft 21 is affixed to the case 20 by a mounting plate and mounting screws. The pulley 22 is a matter of choice for the particular application.

The permanent magnet 23 has an outside diameter of 41.40 mm (1.630 in.), an inside diameter of 35.10 mm (1.382 in.), a total height of 13.33 mm (0.525 inc.), and a thickness of 3.17 mm (0.125 in.). Although the demarcation of the interface between the main field magnet portion 24 and the commutator magnet portion 26 is not clear the approximate height of the main field magnet portion is 10.2 mm (0.4 in.). The magnet (part no. TEI 16290) 23 is constructed of molded plastic including a magnetic material such as barium ferrite [$Ba(FeO_2)_2$] and is selected to have a minimum magnet material energy product of 1.4 $MGO_e$. The main field magnet portion 24 is radially polarized in four arc segments, while the commutator magnet 26 is alternately axially polarized in sixty-four sectors. The air gap between the commutator magnet portion 26 and the printed circuit mounting plate 38 is selected to be 0.25 mm (0.010 in.).

The stator laminator stack 28 is selected to comfortably fit within the rotor 16 and to support the winding coils 30. The winding coils 30 are wound about the lam stack 28 (part no. 825-1035) to a height of 3.81 mm (0.150) and a diameter of 10.16 mm (0.400 in.). The preferred stator 16 utilizes eight windings 30 equally radially spaced about the core 32. The stator core support post 32 (part no. 3000-509) has a height of 15.87 mm (0.625 in.) and an interior diameter of 6.35 mm (0.250 in.). The spacer 36 and bearings 34 are mounted within the core 32 such that the bearings 34 evenly contact the shaft 21 and maintain it in position.

The printed circuit mounting board 38 (part no. 550-8003) has a thickness of 2.28 mm (0.090 in.) and lateral dimensions sufficient to array the conducting traces 39 but otherwise is a matter of choice depending on the application. The mounting plate 38 provides the means by which the assembly 10 is mounted within the application apparatus and thus is selected to be sufficiently strong and rigid for this purpose. The conducting traces 39 are in an array similar to that shown in FIG. 4, and have dimensions equivalent to the polarized sectors 27. The arcical segments 46 are preferably separated by more than 3.17 mm (0.125 in.), the thickness of the magnet 23. The traces are standard printed circuit conducting material such as lead-tin alloy or gold. A mylar sheet provides the insulating layer 43.

If extreme accuracy and frequency range are not paramount the second trace 42 may be eliminated entirely. Manufacturing considerations may also make it desirable to utilize the alternate type of second trace described above instead of the illustrated second trace 42.

The precise dimensions and materials utilized in the assembly are largely a matter of choice. The improved tachometer assembly will function to the specifications of many applications with a single conducting trace 40 while other applications may require such precise measurements that three or more traces, each offset radially and electrically isolated from the others, are necessary. The invention may also be utilized in conjunction with other types of motors by utilizing the commutator ring and trace array configurations disclosed herein.

Those skilled in the art will readily observe that numerous other modifications and alterations of the device may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The improved magnetic motor tachometer assembly of the present invention is particularly for use with high velocity constant rotation applications such as those found in computer system and peripheral technology. The assembly provides a method for sensing the rotational velocity of the motor, thus providing analog analysis and control assemblies with information sufficient to control the motor.

The predominant present usage envisioned for the invention is in conjunction with brushless DC motors although other motor applications are also possible. Particularly, the present invention may be readily used as a position analog sensor for stepper motors.

Since the assembly of the present invention is simple to construct and provides a readily analyzed output, it is expected to be utilized in widespread applications. The high resolution achieved at low cost makes the present assembly ideal for numerous data processing applications. The feature of increasing the resolution by substituting a circuit board including a greater number of traces provides ready adaptability. It is therefore believed that the present invention will have widespread industrial applicability.

I claim:
1. An improved magnetic tachometer assembly for a rotating electrical motor including hollow cylindrical a radially polarized main field magnet, comprising:
 a commutator magnet contiguous with one cylindrical edge of the main field magnet in the form of a ring concentric with the rotating shaft of the motor, the commutator magnet including a plurality of alternately axially polarized sectors of equivalent shape and size arranged radially about the ring; and
 an electrically conductive trace arrayed in the form of a convoluted planar open ring, the trace ring being concentric with the axis of the commutator magnet ring and separated axially from such magnet by an axial air gap, the trace ring being stationary with respect to the commutator magnet ring when the motor is operating and said trace ring array including a plurality of radial segments in which an electrical current is magnetically induced by the relative motion of said polarized sector and whereby said induced current is adapted for delivery by delivery means from the trace ring to analyzing means.

2. The assembly of claim 1 wherein:
the number of alternately polarized sectors in the magnet ring is equal to the number of radial segments in the trace ring array.

3. The assembly of claim 2 wherein:
the number of alternately polarized sectors is sixty-four.

4. The assembly of claim 1 and further including:
a second electrically conductive trace, said second trace being arrayed so as to be spatially congruent to the first trace but being electrically isolated and radially offset from the first trace such that the radial segments of said second trace are arrayed parallel to and between the radial segments of the first trace with respect to the ring magnet, said second trace being independently connected to the analyzing means.

5. The assembly of claim 1 wherein:
the ring magnet is integrally formed with the main field magnet of the motor into a single continuous element, with the ring portion being distinguished only by its magnetization pattern.

6. The assembly of claim 3 wherein:
the ring magnet is integrally formed with the main field magnet of the motor into a single continuous element, with the ring portion being distinguished only by its magnetization pattern; and
the assembly further includes a second electrically conductive trace, said second trace being arrayed so as to be spatially congruent to the first trace but being electrically isolated and radially offset from the first trace such that the radial segments of said second trace are arrayed parallel to and between the radial segments of the first trace with respect to the ring magnet, said second trace being independently connected to the analyzing means.

7. In a magnetic tachometer assembly attached to a brushless direct current motor including a radially polarized cylindrical main field magnet and magnetic sensing means adapted for delivery to analyzing means for determining the rotational velocity of the motor by analog methods, the improvement comprising:
magnetizing a planar ring portion of the main field magnet, the ring portion being coaxial with and arrayed in a plane parallel to the plane of the sensing means and separated therefrom by an axial air gap, to include a plurality of alternately polarized sectors, with each said sector being equivalent in size and shape and each being axially polarized with the opposite polarization to each adjacent sector.

8. The improvement of claim 7 wherein:
the sensing means comprise a planar circuit board mounting plate, stationary with respect to the magnet ring and including at least a first conducting trace arrayed thereon such that the plane of said trace is parallel to the plane of said ring portion of the magnet the trace being arrayed in an open ring fashion including a plurality of radial segments in which an electrical current is induced by the relative motion thereto of said polarized sectors and further including means for delivering said induced current to the analyzing means.

9. The improvement of claim 8 wherein:
said radial segments are equally radially spaced in said conducting trace ring array.

10. The improvement of claim 9 wherein:
the number of said radial segments is equal to the number of said alternately polarized sectors.

11. The improvement of claim 10 wherein:
the number of said alternately polarized sectors is sixty-four.

12. The improvement of claim 11 wherein the sensing means further include:
a second conducting trace array, spatially congruent to but electrically isolated and radially displaced from said first conducting trace, is arrayed upon said circuit board mounting plate, the radial segments of said second conducting trace being arrayed radially between said radial segments of said first conducting trace with respect to said alternately polarized sectors, said second conducting trace array including independent means for delivering induced current to the analyzing means.

13. The improvement of claim 8 wherein the sensing means further include:
a plurality of additional conducting trace arrays, each spatially congruent to but electrically isolated and radially displaced from said first conductive trace and each other additional conductive trace such that the radial segments of each conductive trace array are radially displaced with respect to said alternately polarized sectors and each said array including independent means for delivering said induced current to the analyzing means.

14. The improvement of claim 8 wherein the sensing means further include:
a second conductive trace array similar to, and coaxial with, said first array but electrically isolated from and dispaced radially inside said first array such that the radial segments of said second array overlap said polarized sectors of the planar ring portion, said second trace array including independent means for delivering induced current to the analyzing means.

15. The assembly of claim 1 and further including:
a second electrically conductive trace coaxial with and similarly shaped as the first trace but electrically isolated from and displaced radially inside the first trace while still overlapping the field of the commutator magnet, said second trace being independently connected to the analyzing means.

* * * * *